US011487169B2

(12) United States Patent
Xu et al.

(10) Patent No.: US 11,487,169 B2
(45) Date of Patent: Nov. 1, 2022

(54) SUBSTRATE COMPRISING A FIRST LEAD HAVING A CURVED SECTION CLOSE TO A BONDING ELECTRODE AND A STRAIGHT SECTION CLOSE TO AN EDGE OF A SUBSTRATE AND DISPLAY PANEL

(71) Applicants: Fuzhou BOE Optoelectronics Technology Co., Ltd., Fujian (CN); BOE Technology Group Co., Ltd., Beijing (CN)

(72) Inventors: Xu Xu, Beijing (CN); Shanshan Xu, Beijing (CN); Wenchao Wang, Beijing (CN); Xin Fang, Beijing (CN)

(73) Assignees: Fuzhou BOE Optoelectronics Technology Co., Ltd., Fujian (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/281,586

(22) PCT Filed: Dec. 24, 2020

(86) PCT No.: PCT/CN2020/139084
§ 371 (c)(1),
(2) Date: Mar. 31, 2021

(87) PCT Pub. No.: WO2021/136067
PCT Pub. Date: Jul. 8, 2021

(65) Prior Publication Data
US 2022/0121049 A1 Apr. 21, 2022

(30) Foreign Application Priority Data
Jan. 2, 2020 (CN) .......................... 202020007390.6

(51) Int. Cl.
*G02F 1/1345* (2006.01)

(52) U.S. Cl.
CPC ........ *G02F 1/1345* (2013.01); *G02F 1/13452* (2013.01); *G02F 1/13458* (2013.01)

(58) Field of Classification Search
CPC .................................................. G02F 1/13456
See application file for complete search history.

(56) References Cited

U.S. PATENT DOCUMENTS

2005/0231495 A1* 10/2005 Ishibashi .............. G09G 3/3611
345/204
2012/0249469 A1* 10/2012 Lin ........................ G09G 5/006
345/173
2021/0151468 A1 5/2021 Li et al.

FOREIGN PATENT DOCUMENTS

CN 202275249 U 6/2012
CN 106873265 A 6/2017
(Continued)

OTHER PUBLICATIONS

International Search Report for PCT/CN2020/139084 dated Mar. 22, 2021.

*Primary Examiner* — Paul C Lee
(74) *Attorney, Agent, or Firm* — Ling Wu; Stephen Yang; Ling and Yang Intellectual Property

(57) ABSTRACT

A substrate and a display panel are provided, which relate to the technical field of display apparatus. The substrate includes an active area and a bonding area located outside the active area and close to an edge of the substrate, wherein a bonding electrode is disposed within the bonding area, a first lead extending toward the edge of the substrate is connected to one side of the bonding electrode toward the edge of the substrate, and the first lead includes a curved section close to the bonding electrode and a straight section close to the edge of the substrate.

16 Claims, 4 Drawing Sheets

(56) References Cited

FOREIGN PATENT DOCUMENTS

| | | | | | |
|---|---|---|---|---|---|
| CN | 107895727 | A | * | 4/2018 | ........... G02F 1/1333 |
| CN | 108845465 | A | * | 11/2018 | ......... G02F 1/13452 |
| CN | 108845465 | A | | 11/2018 | |
| CN | 109521584 | A | | 3/2019 | |
| CN | 109782501 | A | | 5/2019 | |
| CN | 110706602 | A | | 1/2020 | |
| CN | 210954556 | U | | 7/2020 | |
| JP | 2002-287662 | A | | 10/2002 | |
| JP | 2002287662 | A | * | 10/2002 | ......... G02F 1/13452 |
| KR | 10-2005-0068855 | A | | 7/2005 | |
| WO | 2020098235 | A1 | | 5/2020 | |

\* cited by examiner

SUBSTRATE COMPRISING A FIRST LEAD HAVING A CURVED SECTION CLOSE TO A BONDING ELECTRODE AND A STRAIGHT SECTION CLOSE TO AN EDGE OF A SUBSTRATE AND DISPLAY PANEL

The present application claims the priority of the Chinese patent application No. 202020007390.6, entitled "Substrate and Display Panel", filed to the CNIPA on Jan. 2, 2020, the content of which should be interpreted as being incorporated into the present application by reference.

TECHNICAL FIELD

Embodiments of the present disclosure relate to, but are not limited to, the technical field of display apparatus, specifically to a substrate and a display panel.

BACKGROUND

In some large-size display panel products, detection leads of bonding electrodes of an array substrate are designed to be straight lines. An adhesion area between electrode leads of this design and the substrate is smaller, and a corresponding adhesion force is weaker. At an edge of the array substrate, the adhesion force is lower due to breakage of the electrode lead, and it is easy for a phenomenon of falling off of the bonding electrodes to occur (frequently in non-cutting products) when an operation such as removing of a Chip On Film and an Anisotropic Conductive Film (COF&ACF) is performed.

In order to improve bad peeling of the bonding electrode, a Zigzag design is usually adopted for the electrode leads, that is, by using bending wiring, the adhesion area between the electrode leads and the substrate is increased and the adhesion force is improved. However, with the improvement of technology and the reduction of cost, data lines arranged in a single Chip On Film (COF) are increased, and accordingly a space between bonding electrodes becomes smaller and smaller, that is, a space between electrode leads becomes smaller. The space between the electrode leads will be further reduced if Zigzag is used. After processes such as cutting and grinding, it is extremely easy to cause short circuit of adjacent electrode leads and an occurrence of Dataline Dataline Short (DDS).

SUMMARY

The following is a summary of the subject matter described in detail in the present disclosure. This summary is not intended to limit the protection scope of the claims.

The present disclosure provides a substrate, including an active area and a bonding area located outside the active area and close to an edge of the substrate, wherein a bonding electrode is disposed within the bonding area, a first lead extending toward the edge of the substrate is connected to one side of the bonding electrode toward the edge of the substrate, and the first lead includes a curved section close to the bonding electrode and a straight section close to the edge of the substrate.

In an exemplary embodiment, a distance between the curved section of the first lead and the edge of the substrate is greater than 0.2 mm.

In an exemplary embodiment, the first lead is disposed perpendicular to the edge of the substrate, and the straight section of the first lead extends to the edge of the substrate.

In an exemplary embodiment, a distance between the bonding electrode and the edge of the substrate is L, a length of the curved section of the first lead on a direction perpendicular to the edge of the substrate is a, and a length of the straight section of the first lead is b, wherein $L=a+b$, and $b=L/3$ to $L/2$.

In an exemplary embodiment, a width of the curved section of the first lead is less than or equal to a width of the bonding electrode.

In an exemplary embodiment, the bonding electrode includes a first metal layer, an insulating layer and a second metal layer which are sequentially stacked on a substrate, wherein the second metal layer is connected with the first metal layer through a via hole disposed on the insulating layer, the second metal layer is used for bonding and connecting with an external circuit board, and the first lead is connected with the first metal layer.

In an exemplary embodiment, one side of the bonding electrode far away from the first lead is connected with a second lead, and the second lead is connected with the first metal layer and connected with a signal line within the active area; and the first lead, the first metal layer and the second lead are disposed on a same layer.

In an exemplary embodiment, a material of the second metal layer includes a transparent material.

In an exemplary embodiment, multiple bonding electrodes are disposed, and first leads of the multiple bonding electrodes are disposed in parallel.

The present disclosure also provides a display panel, including any of the substrates.

Other aspects will become apparent upon reading and understanding accompanying drawings and the detailed description.

BRIEF DESCRIPTION OF DRAWINGS

The attached drawings are used to provide a further understanding of the technical solution of the present disclosure, and constitute a part of the specification. They are used together with the embodiments of the present application to explain the technical solution of the present disclosure, and do not constitute a restriction on the technical solution of the present disclosure.

DETAILED DESCRIPTION

The technical solution of the present disclosure will be further explained with reference to the drawings and through specific embodiments. It may be understood that the specific embodiments described herein are only used to explain the present disclosure, but not to limit the present disclosure. The embodiments and features in the embodiments in the present disclosure may be combined randomly if there is no conflict.

Figure 1:
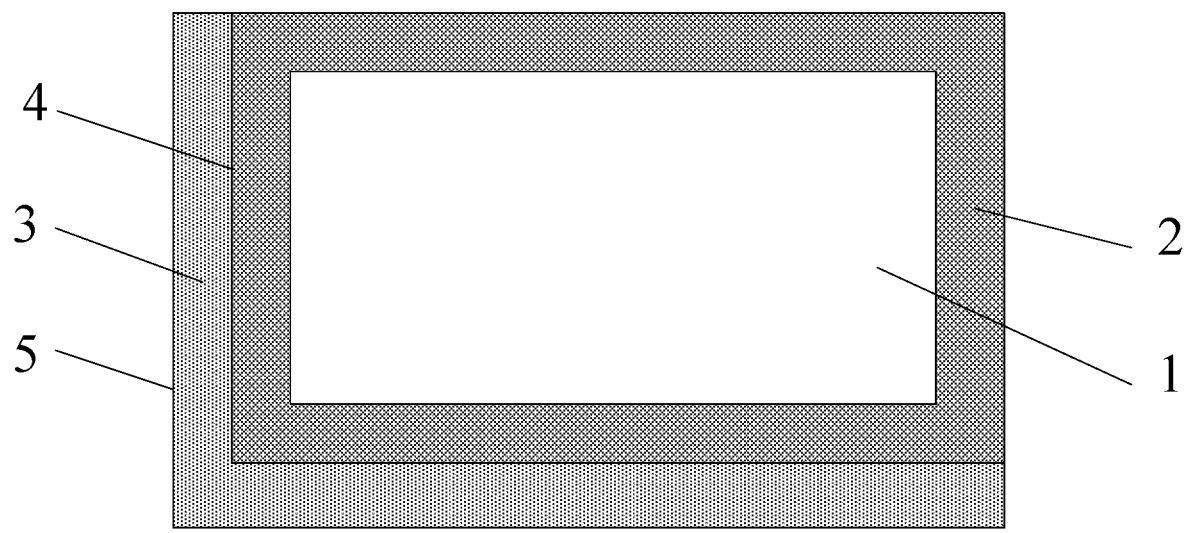
FIG. 1 is a schematic overlooking structural diagram of a display panel.

As shown in FIG. 1, FIG. 1 shows an overlooking structural diagram of a display panel. Taking a liquid crystal display panel as an example, which includes an array substrate and a color filter substrate which are oppositely attached, wherein two sides (or one side) of the array substrate are disposed protruding from the color filter substrate, and a part of the array substrate protruding from an edge 4 of the color filter substrate forms a bonding area 3 (i.e., a Pad area, also called a padded area). An overlapping part of the array substrate with the color filter substrate includes a middle Active Area 1 (AA area for short) and a Sealing Area 2 located around the Active Area 1. The sealing area 2 is used for bonding and fixing a peripheral edge of the color filter substrate with the array substrate. A bonding electrode is disposed within the bonding area 3 of the array substrate and is used for bonding and electrically connecting with an external circuit board to provide a signal to the display panel.

Figure 2:
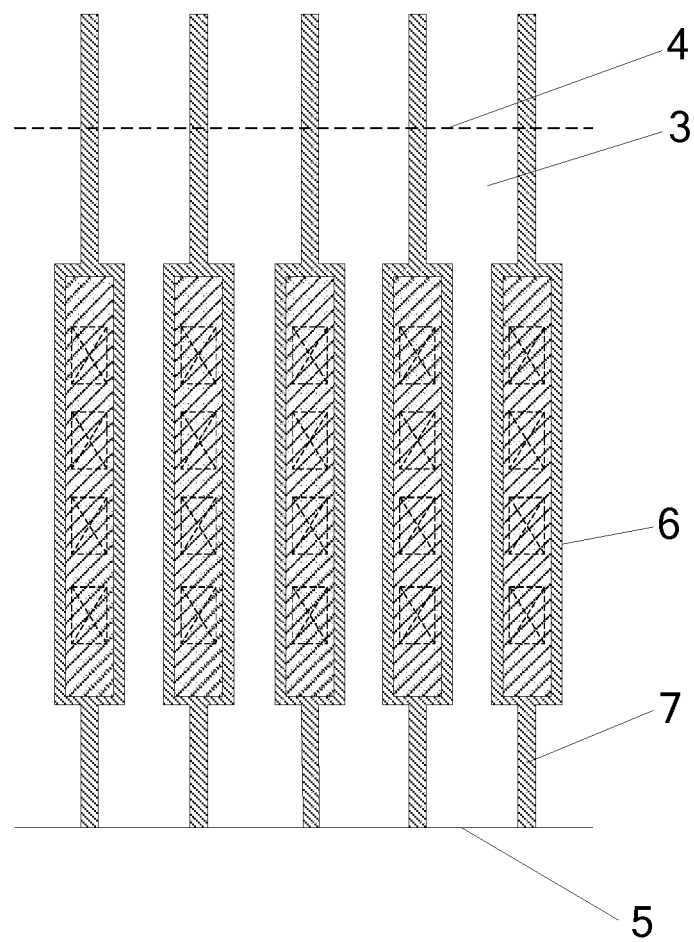
FIG. 2 is a schematic structural diagram of a bonding electrode of a substrate in the display panel of FIG. 1 and a detection lead connected thereto.

As shown in FIG. 2, FIG. 2 shows a schematic structural diagram of a bonding electrode 6 within the bonding area 3 of the array substrate in a large-size (such as 110 inches, etc.) display panel of FIG. 1 and a detection lead connected to the bonding electrode 6. In FIG. 2, the bonding electrode 6 is connected with a first lead 7, where the first lead 7 is a detection lead used for introducing a test signal to the inside of the array substrate. The whole detection lead is designed to be straightened, so an adhesion force between the detection lead and the array substrate is weak, which easily drives the bonding electrode 6 to fall off, resulting in that external signals cannot enter the display panel through the bonding electrode 6.

Figure 3:
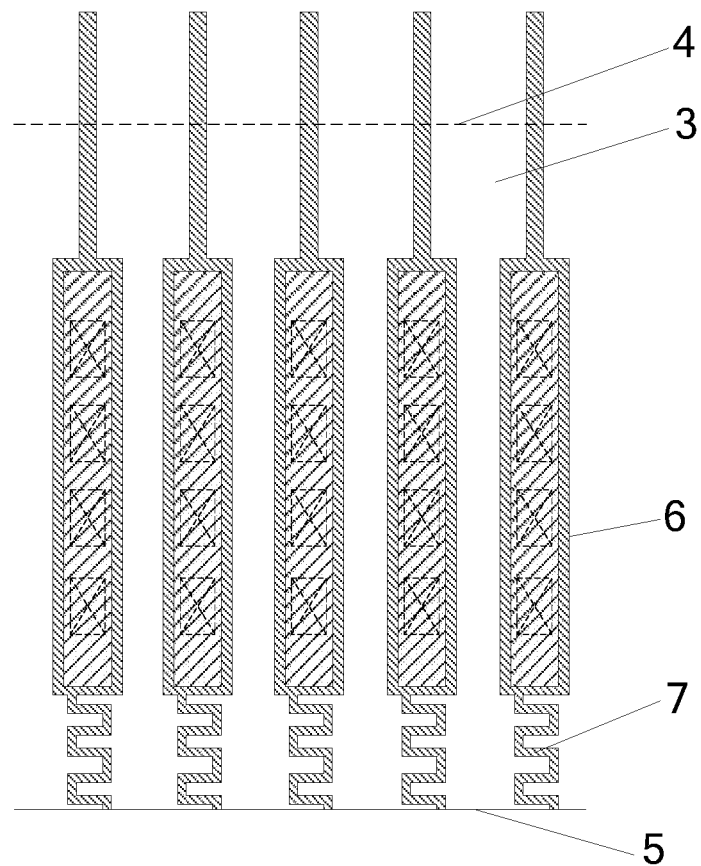
FIG. 3 is a schematic structural diagram of a bonding electrode of a substrate and a detection lead connected thereto.

As shown in FIG. 3, FIG. 3 shows a structure of at least one bonding electrode 6 and a detection lead connected thereto. In this design, in order to improve poor peeling of the bonding electrode 6 in the design in FIG. 2, the whole detection lead (i.e., the first lead 7) is designed with a Zigzag wiring, that is, by using bending wiring, the adhesion area between the detection lead and the array substrate is increased, and the adhesion force is improved, such as 82-inch and 86-inch products, etc. However, with the improvement of technology and the reduction of cost, data lines arranged by a single Chip On Film (COF) are increased, that is, a space between signals (a width w of the bonding electrode 6 and a spacing s of bonding electrodes 6) decreases, and accordingly a space between bonding electrodes 6 becomes smaller and smaller, that is, a space between detection leads decreases. The space between the detection leads will be further reduced by using Zigzag. After processes such as cutting and grinding (a mother substrate is cut to form multiple substrates, and a cutting surface forms an end surface of the substrate, wherein the end surface of the substrate generally needs to be ground after cutting), it is extremely easy to cause short circuit of adjacent detection leads and an occurrence of poor DDS.

Figure 4:
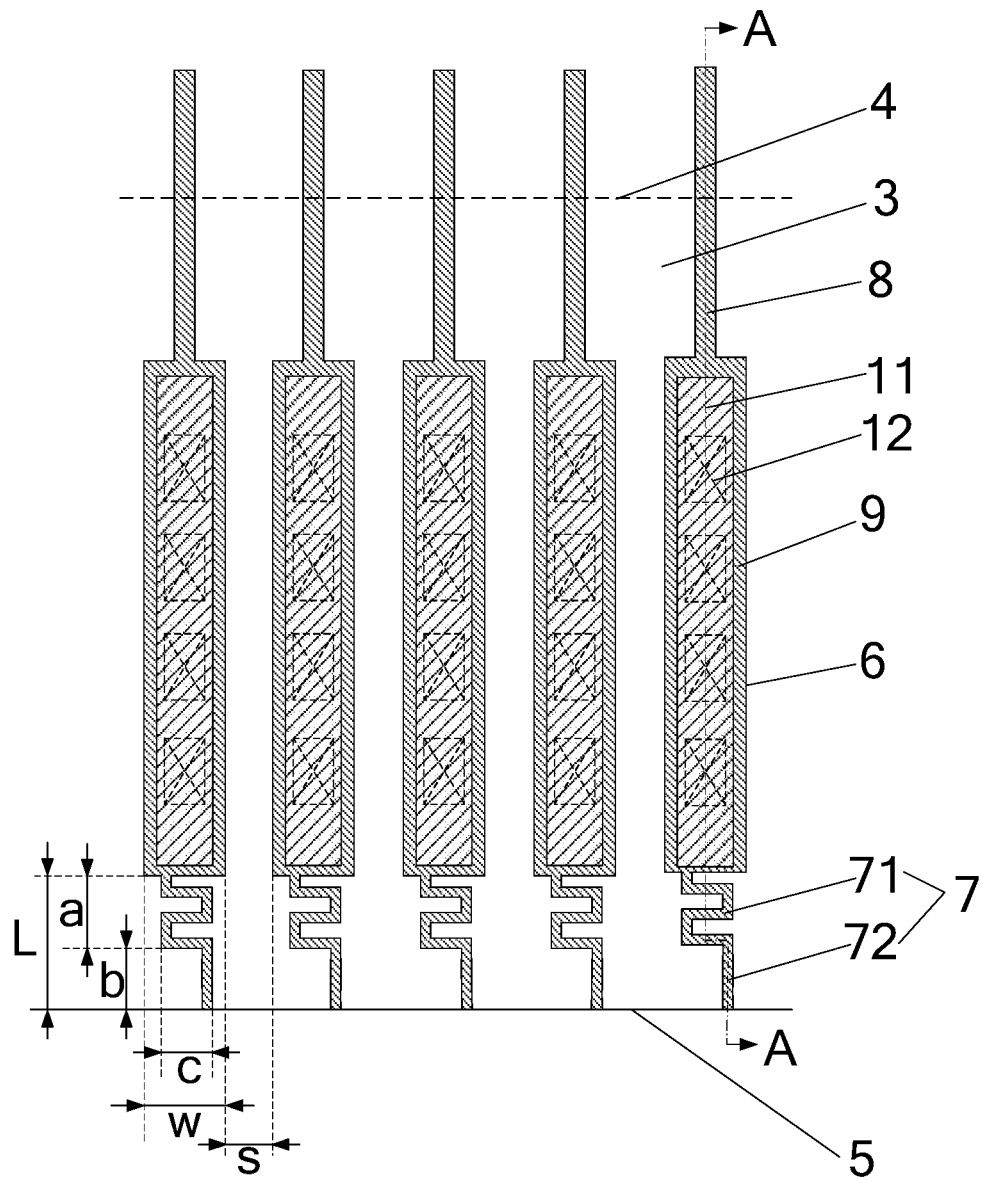
FIG. 4 is a schematic partial overlooking structural diagram of a bonding area of a substrate according to an embodiment of the present disclosure.

With continued reference to FIG. 1, an embodiment of the present disclosure provides a substrate, which includes an active area 1 and a bonding area 3 located outside the active area 1 and close to an edge 5 of the substrate. As shown in FIG. 4, a bonding electrode 6 is disposed within the bonding area 3, and a first lead 7 extending toward the edge 5 of the substrate is connected to one side of the bonding electrode 6 toward the edge 5 of the substrate, and the first lead 7 includes a curved section (which may be Zigzag-shaped, etc.) close to the bonding electrode 6 and a straight section close to the edge 5 of the substrate.

In an exemplary embodiment, the bonding electrode 6 is used for bonding and electrically connecting with an external circuit board to provide a driving signal to the inside of the substrate. The first lead 7 may be used as a detection lead for introducing a test signal to the inside of the substrate through the bonding electrode 6.

As shown in FIG. 4, in the substrate of this exemplary embodiment, the first lead 7 of the bonding electrode 6 toward the side of edge 5 of the substrate is designed to include a curved section 71 near the bonding electrode 6 and a straight section 72 near the edge 5 of the substrate. In this way, the adhesion force between the first lead 7 and the substrate is improved through the curved section 71 of the first lead 7, which improves the poor peeling of the bonding electrode 6, and the defect of Dataline Dataline Short (DDS) of the adjacent first leads 7 caused by cutting and grinding is improved through the straight section 72 of the first lead 7, both of which complement each other and improve use reliability of the bonding electrode 6, and are suitable for a large-size display panel.

Considering the cutting and grinding process capability of G8.5 generation glass at present, in which a cutting fluctuation range is ±0.1 mm and grinding accuracy is 0.1 mm, in order to prevent the poor DDS of the substrate caused during the cutting and grinding process, in an exemplary embodiment, a distance between the curved section 71 of the first lead 7 and the edge 5 of the substrate is greater than 0.2 mm.

As shown in FIG. 4, the first lead 7 may be disposed perpendicular to the edge 5 of the substrate, and the straight section 72 of the first lead 7 extends to the edge 5 of the substrate. Among which, a space between the bonding electrode 6 and the edge 5 of the substrate is L, that is, a length of the first lead 7 on a direction perpendicular to the edge 5 of the substrate is L, a length of the curved section 71 of the first lead 7 on a direction perpendicular to the edge 5 of the substrate is a, and a length of the straight section 72 of the first lead 7 is b, wherein L=a+b, and b is greater than 0.2 mm. With the increase of the value of b, the value of a decreases, which goes against the improvement of the adhesion force between the first lead 7 and the substrate. Therefore, in an exemplary embodiment, b=L/3 to L/2, which ensures the adhesion force as well as avoids an occurrence of poor DDS. Taking L=0.6 mm (that is, a+b=0.6 mm) as an example, it may be that b=0.2 to 0.3 mm, and correspondingly a=0.3 to 0.4 mm.

A width c of the curved section 71 of the first lead 7 may be less than or equal to the width w of the bonding electrode 6, that is, c≤w, too large c may also cause DDS, and too small c goes against improving the adhesion force between the first lead 7 and the substrate.

Taking the 98-inch product design layout as an example, the width w of the bonding electrodes 6 is w=23 um, the spacing s of the bonding electrodes 6 is 20 um, and a total length L of the first leads 7 is L=0.7 mm, wherein a vertical length a of the curved section 71 of the first leads 7 is a=0.36 mm, a length b of the straight section 72 of the first leads 7 is b=0.34 mm, and a width c of the curved section 71 of the first leads 7 is c=w=23 um.

Figure 5:
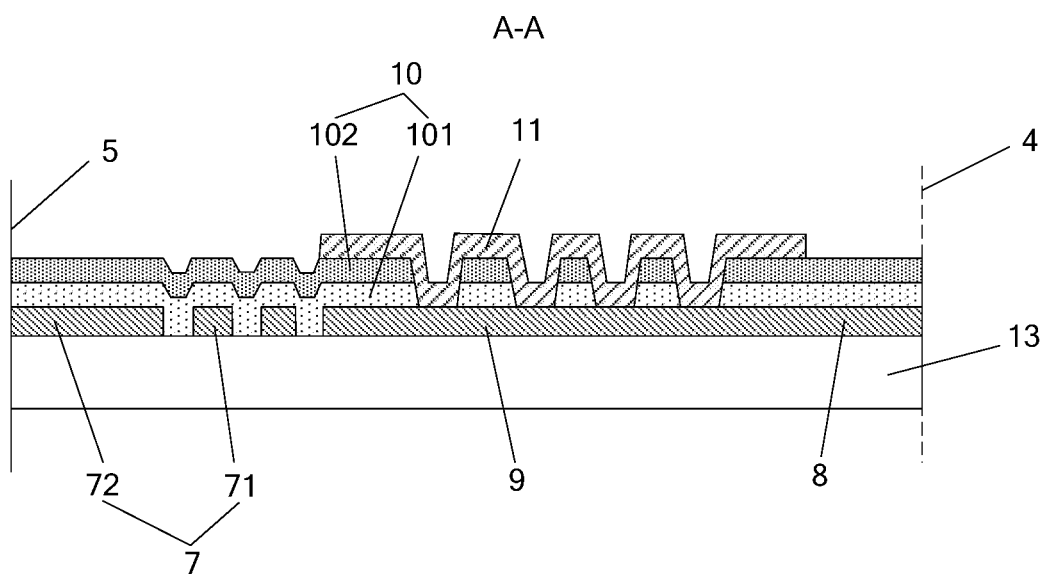
FIG. 5 is a diagram of A-A section in FIG. 4.

As shown in FIGS. 4 and 5, the bonding electrode 6 may include a first metal layer 9, an insulating layer 10, and a second metal layer 11 (the first metal layer 9 is arranged closer to the substrate 13 than the second metal layer 11), which are sequentially stacked on the substrate 13, wherein the second metal layer 11 is connected with the first metal layer 9 through a via hole 12 disposed on the insulating layer 10. The second metal layer 11 is used for bonding and connecting with an external circuit board to provide a driving signal to the inside of the substrate. As shown in FIG. 4, an end part of the curved section 71 of the first lead 7 is connected to one side of the first metal layer 9 toward an edge 5 of the substrate, and the straight section 72 of the first lead 7 extends to the edge 5 of the substrate. The first lead 7 may be used for introducing a test signal to the inside of the substrate through the first metal layer 9.

As shown in FIGS. 4 and 5, a second lead 8 is connected to one side of the bonding electrode 6 away from the first lead 7, and an end of the second lead 8 is connected to one side of the first metal layer 9 away from the first lead 7. The second lead 8 is also connected to a signal line within the active area 1. Among which, the second lead 8 is used for transmitting an electrical signal (including an external test signal or a driving signal, etc.) obtained by the bonding electrode 6 to a signal line inside the substrate, wherein the signal line may be a gate line, a data line, etc. The first lead 7, the first metal layer 9 and the second lead 8 may be arranged on a same layer, and may be made of a same material and arranged on a same layer as the gate line or the data line of the substrate. The insulating layer 10 may include a gate insulating layer 101 and a passivation layer 102 which are sequentially stacked, wherein the gate insulating layer 101 covers the first metal layer 9.

A material of the second metal layer 11 may include a transparent material, such as Indium Tin Oxide (ITO).

As shown in FIG. 4, multiple bonding electrodes 6 are disposed, wherein each bonding electrode 6 may be connected with a corresponding signal line (such as a gate line or a data line) within the active area 1 through a second lead 8 connected thereto. The first leads 7 of the multiple bonding electrodes 6 may be disposed in parallel.

An embodiment of the present disclosure also provides a display panel, which includes the substrate. The display panel of this exemplary embodiment may be a liquid crystal display panel or an OLED panel, etc. The substrate is a driving substrate, and it is an array substrate in the liquid crystal display panel.

For the substrate of the present disclosure, the first lead of the bonding electrode toward the edge side of the substrate is designed to include a curved section close to the bonding electrode and a straight section close to the edge of the substrate. In this way, the adhesion force between the first lead and the substrate is improved through the curved section of the first lead, which improves the poor peeling of the bonding electrode, and the defect of Dataline Dataline Short (DDS) of the adjacent first leads caused by cutting and grinding is improved through the straight section of the first lead, both of which complement each other and improve use reliability of the bonding electrode.

In the description of embodiments of the present disclosure, the terms "connection", "fixed connection", "installation" and "assembly" are to be understood broadly, for example, they may be fixed connection, or they may be detachable connection, or they may be integrally connected, unless explicitly specified and limited otherwise. The terms "installation", "connection" and "fixed connection" may be directly connected, or may be indirectly connected through an intermediate medium, or may be an internal connection between two elements. For those of ordinary skills in the art, the specific meanings of the above terms in embodiments of the present disclosure may be understood according to specific situations.

What is claimed is:

1. A substrate, comprising:
an active area and a bonding area located outside the active area and close to an edge of the substrate, wherein a bonding electrode is disposed within the bonding area, a first lead extending toward the edge of the substrate is connected to one side of the bonding electrode toward the edge of the substrate, and the first lead comprises a curved section close to the bonding electrode and a straight section close to the edge of the substrate;
wherein a distance between the bonding electrode and the edge of the substrate is L, a length of the curved section of the first lead on a direction perpendicular to the edge of the substrate is a, and a length of the straight section of the first lead is b, wherein L=a+b and b=L/3 to L/2.

2. The substrate of claim 1, wherein a distance between the curved section of the first lead and the edge of the substrate is greater than 0.2 mm.

3. The substrate of claim 2, wherein the first lead is disposed perpendicular to the edge of the substrate, and the straight section of the first lead extends to the edge of the substrate.

4. The substrate of claim 2, wherein a width of the curved section of the first lead is less than or equal to a width of the bonding electrode.

5. The substrate of claim 1, wherein the bonding electrode comprises a first metal layer, an insulating layer and a second metal layer which are sequentially stacked on the substrate, wherein the second metal layer is connected with the first metal layer through a via hole disposed on the insulating layer, the second metal layer is used for bonding and connecting with an external circuit board, and the first lead is connected with the first metal layer.

6. The substrate of claim 5, wherein one side of the bonding electrode away from the first lead is connected with a second lead, and the second lead is connected with the first metal layer and connected with a signal line within the active area; and the first lead, the first metal layer and the second lead are disposed on a same layer.

7. The substrate of claim 5, wherein a material of the second metal layer comprises a transparent material.

8. The substrate of claim 1, wherein a plurality of bonding electrodes are disposed, and first leads of the plurality of bonding electrodes are disposed in parallel.

9. A display panel, comprising the substrate of claim 1.
10. A display panel, comprising the substrate of claim 2.
11. A display panel, comprising the substrate of claim 3.
12. A display panel, comprising the substrate of claim 4.
13. A display panel, comprising the substrate of claim 5.
14. A display panel, comprising the substrate of claim 6.
15. A display panel, comprising the substrate of claim 7.
16. A display panel, comprising the substrate of claim 8.

* * * * *